(12) United States Patent
Thorn

(10) Patent No.: US 9,480,131 B1
(45) Date of Patent: Oct. 25, 2016

(54) CONFIGURATION OF AMBIENT LIGHT USING WIRELESS CONNECTION

(71) Applicant: Sony Mobile Communications Inc., Tokyo (JP)

(72) Inventor: Ola Thorn, Limhamn (SE)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 0 days.

(21) Appl. No.: 14/724,135

(22) Filed: May 28, 2015

(51) Int. Cl.
*H05B 37/02* (2006.01)
*H05B 39/04* (2006.01)
*H05B 41/36* (2006.01)

(52) U.S. Cl.
CPC ...... *H05B 37/0272* (2013.01); *H05B 37/0227* (2013.01)

(58) Field of Classification Search
None
See application file for complete search history.

(56) References Cited

U.S. PATENT DOCUMENTS

| | | |
|---|---|---|
| 2007/0189026 A1 | 8/2007 | Chemel |
| 2010/0176752 A1 | 7/2010 | Xiong |
| 2010/0244745 A1 | 9/2010 | Wendt |
| 2010/0265414 A1 | 10/2010 | Nieuwlands |
| 2012/0287334 A1 | 11/2012 | Feri |
| 2014/0104245 A1 | 4/2014 | Li |

OTHER PUBLICATIONS

International Search Report from corresponding International Application No. PCT/IB2015/059165, mailed Mar. 7, 2016.

*Primary Examiner* — Anh Tran
(74) *Attorney, Agent, or Firm* — Tucker Ellis LLP

(57) ABSTRACT

The present invention relates to a method and system for providing ambient light based on visual media content being displayed on a display of a host device. The host device has a wireless connection to at least one lighting device. The method comprises the steps of determining a relative position of the at least one lighting device based on characteristics of the wireless connection between the host device and the at least one lighting device, and identifying at least one portion of the display of the host device correlating to the relative position of the at least one lighting device. The method further comprises controlling the at least one lighting device to provide a lighting characteristic which matches the correlated portion.

20 Claims, 4 Drawing Sheets

CONFIGURATION OF AMBIENT LIGHT USING WIRELESS CONNECTION

TECHNICAL FIELD

The present disclosure generally relates to the field of methods and systems for providing ambient light based on visual media content being displayed on a display of a host device which has a wireless connection to at least one lighting device.

BACKGROUND OF THE INVENTION

To create a truly immersive cinematic experience at home there may be several requirements. For example, a powerful surround sound system may be needed to fully appreciate the sound and sound effects from the content. Further, a large display may be needed in order to appreciate the visual content being played thereon. More importantly, the illumination and color setting of the room may need to be adapted to provide an environment where the visual content may be fully enjoyed regardless of the size of the display. For example, the ambient light in the room may need to be dimmed or reduced in order to avoid light pollution, e.g. causing streaks of light on a display or providing an ambient lighting environment in contrast to the visual content, e.g. high brightness white light during a dark scene of the visual content or no bright light during a scene of the visual content which is otherwise white and bright. Manually adapting the light setting within a room where visual content is experiences is tedious and time consuming. There are known TV sets which provides ambient light by using light sources mounted in the frame of the TV set for communicating the look and feel of visual content being displayed. However, such devices may be expensive and there may be limitation to where such devices can be placed or the amount of light they may provide.

Hence, there is a general desire to provide a solution which can to reduce the amount of time consumed for adapting the lighting setting within a room and increase the immersive experience for a user to more fully appreciate the visual content being displayed on a device such a TV, phone, tablet, and computer.

SUMMARY OF THE INVENTION

In view of the above, an objective of the invention is to solve or at least reduce one or several of the drawbacks discussed above. Generally, the above objective is achieved by the attached independent patent claims.

According to a first aspect of the present invention, this and other objectives are achieved by a method for providing ambient light based on visual media content being displayed on a display of a host device. The host device has a wireless connection to at least one lighting device. The method comprises the steps of determining a relative position of the at least one lighting device based on characteristics of the wireless connection between the host device and the at least one lighting device, and identifying at least one portion of the display of the host device correlating to the relative position of the at least one lighting device. The method further comprises controlling the at least one lighting device to provide a lighting characteristic which matches the correlated portion.

The present invention is based on the realization that by using relative positioning detection through a wireless connection enables the control of lighting devices wirelessly connected to the host device to provide a lighting characteristic which matches correlated portions of the display of the host device. The present invention provides a more immersive experience where a correlated portion of the display of the host device is used to control the lighting characteristics for at least one lighting device such that the ambient lighting relates to the visual media content being displayed. An additional advantage is the present invention allows for automatic control of the lighting devices such that no additional tedious and time consuming setup is needed, a user may simply automatically or manually connect lighting devices to the host device, and then the lighting devices are controlled to provide lighting characteristics matching correlated portions of the display of the host device. The present invention also provides for automatic recalibration of connected lighting devices in case the host device is moved or rotated.

A lighting device should within the context of this application be interpreted broadly as either a fixed, e.g. luminaire or light bulb having a wireless connection, or as another device capable of controlling the light output from a display such as a phone, tablet, or any other device capable of emitting light to which a direction may be determined using the wireless connection. Further, lighting characteristic should within the context of this application be interpreted broadly as hue or color, intensity or brightness, cone or beam angle, time variance, direction. Thus, controlling the at least one lighting device to provide a lighting characteristic which matches the correlated portion may comprise at least partially matching at least one or more of the mentioned lighting characteristics. Controlling the lighting device may also comprise controlling at which frequency a lighting device flashes, the luminosity, the cone of light being emitted from the lighting device, and/or the angle at which light is emitted from the lighting device.

In various embodiments of the invention the relative position may include a distance between the host device and the at least one lighting device. Hence, it should be understood that the lighting characteristic may be controlled to e.g. provide a larger or smaller amount of light, as in higher brightness, intensity or luminosity, if e.g. the relative position indicates large or small distances to take into account effects such as the fall off of the intensity of light due to distances within a larger room or smaller room.

It should be understood that the at least one lighting device may be continuously controlled in order to provide real-time ambient lighting relating to the content being displayed in a correlated portion. The at least one lighting device may be continuously controlled at a frequency which may be set at the same frequency as the frame rate of the visual content being displayed, e.g. 12-240 Hz, or a higher or lower frequency.

The step of determining a relative position of the at least one lighting device may comprise detecting at least one of: angle of arrival or angle of departure of signals in the wireless connection between the host device and the at least one lighting device. By using angle of arrival or angle of departure, only one of the devices which transmits and receives signals, e.g. the host device or the lighting device, need to have at least two antennas, or a plurality of antennas, to determine the relative position or direction to the other devices. Thereby, the cost and complexity of the system may be low.

According to one embodiment of the invention, the correlated portion of the display of the host device is a portion of the display of the host device which is closest to the at least one lighting device. The method may further comprise the step of determining a mean color of the correlated portion of the display of the host device, and wherein the step of controlling the at least one lighting device to provide a lighting characteristic which matches the correlated portion comprises calibrating the at least one lighting device to provide at least the mean color of the correlated portion. Thus, the at least one lighting device which is closest to a portion of the display to which it correlates, e.g. the left portion of the display correlates to a lighting device having a relative position to the left of the display of the host device. Determining a mean color of the correlated portion of the display of the host device may comprise calculating the mean color based on the pixels comprised in the correlated portion. Calibrating the at least one lighting device to provide at least the mean color of the correlated portion comprises controlling the lighting device to adapt the color being emitted to resemble the mean color of the correlated portion. Alternatively, the step of calibrating the at least one lighting device comprises providing a complementary color of the mean color of the correlated portion.

According to one embodiment of the invention, the media content being displayed on the display of the host device may comprise 3D content. The method may further comprise the step of identifying at least one source of lighting within the 3D content, and wherein the step of controlling the at least one lighting device to provide a lighting characteristic which matches the correlated portion comprises controlling the at least one lighting device to provide a lighting characteristic matching the at least one source of lighting within the 3D content. Hence, the at least one lighting device may be located e.g. behind an observer of the display and may correspond to at least one source of lighting within the 3D content being displayed such that the observer experiences the source of lighting as if appearing behind him or her in the room.

The step of determining a relative position of the at least one lighting device may further comprise detecting whether the at least one lighting device is present in the vicinity of the host device by detecting a signal strength of the wireless connection between the host device and the at least one lighting device, and determining whether the signal strength reaches a threshold signal strength. The threshold signal strength may be a predetermined signal strength determined such that lighting devices which are likely to be spaced apart from the host device by more than predetermined distance may not reach the threshold signal strength. Likewise, lighting devices behind obstacles, e.g. walls or doors may not reach the threshold signal strength. Lighting devices which do not reach the threshold signal strength are preferably not controlled to match the lighting characteristics of a correlated portion of the display.

According to some embodiments of the invention, the method may further comprise the step of detecting a change in the relative position of the at least one lighting device, based on at least one of: a detected change in the signal strength of the wireless connection between the at least one lighting device and the host device, a detected change in the position of the at least one lighting device with respect to the host device, a movement signal from a component in the host device, a movement signal from a component in the lighting device. The step of controlling the at least one lighting device may comprise adapting the lighting characteristics of the at least one lighting device according to the new relative position.

In one exemplary embodiment of the invention, controlling the at least one lighting device to provide a lighting characteristic which matches the correlated portion may further comprise determining a position of an observer of the visual content being displayed on the host device, and controlling the at least one lighting device to provide a lighting characteristic based on the relative position between the observer of the visual content being displayed on the host device and the at least one lighting device. The position of the observer of the visual content being displayed on the host device may be determined by identifying the observer using a camera mounted in the host device, in at least one lighting device or a camera mounted in the room where the host device is located. The position of the observer of the visual content being displayed on the host device may be used to determine distance or angle between the observer of the visual content being displayed on the host device and the at least one lighting device. Controlling the at least one lighting device to provide a lighting characteristic based on the relative position between the observer of the visual content being displayed on the host device and the at least one lighting device may comprise controlling any lighting characteristic based on the relative position. For example, increasing or decreasing the brightness or luminosity of the light being emitted from the lighting device, or controlling the cone of light being emitted from the lighting device, and/or the angle at which light is emitted from the lighting device in order to also take into account the position of the observer. Another exemplary use of the relative position between the observer of the visual content being displayed on the host device and the at least one lighting device is to control the at least one lighting device to emit no light if the at least one lighting device is positioned in a path between the observer of the visual content being displayed on the host device as a lighting device emitting light can then lead to deteriorated visual experience.

According to a second aspect of the present invention, the objectives are also at least partly achieved by a host device for providing ambient light based on visual media content being played on the host device, wherein the host device has a wireless connection to at least one lighting device. The host device comprises a display for displaying visual media content, at least two antennas, and a processing unit connected to the at least two antennas for detecting at least one of angle of arrival and angle of departure of signals in the wireless connection between the host device and the least one lighting device. The processing unit is configured to determine a relative position of the at least one lighting device based on characteristics of the wireless connection between the host device and the at least one lighting device. The characteristics of the wireless connection comprises at least one of angle of arrival and angle of departure of signals in the wireless connection between the host device and the at least one lighting device. The processing unit is further configured to identify at least one portion of the display of the host device correlating to the relative position of the at least one lighting device, and control the at least one lighting device to provide a lighting characteristic which matches the correlated portion.

The second aspect may generally have the same features and advantages as the first aspect.

According to a further aspect of the present invention, the objectives are also at least partly achieved by a system for providing ambient light based on visual media content being played on a host device, wherein the host device has a wireless connection to at least one lighting device. The system comprises at least one lighting device, and a host device comprising a display for displaying visual media content, at least two antennas, and a processing unit connected to the at least two antennas for detecting at least one of angle of arrival and angle of departure of signals in the wireless connection between the host device and the at least one lighting device. The processing unit is configured to determine a relative position of the at least one lighting device based on characteristics of the wireless connection between the host device and the at least one lighting device, the characteristics of the wireless connection comprising at least one of angle of arrival and angle of departure of signals in the wireless connection between the host device and the at least one lighting device, and the processing unit is further configured to identify at least one portion of the display of the host device correlating to the position of the at least one lighting device, and control the at least one lighting device to provide a lighting characteristic which matches the correlated portion.

This further aspect may generally have the same features and advantages as the first aspect or second aspect.

The correlated portion of the display of the host device may be a portion of the display of the host device which is closest to the at least one lighting device, and the processing unit may be configured to determine a mean color of the correlated portion of the display of the host device, and wherein the processing unit is configured to control the at least one lighting device to provide a lighting characteristic which matches the correlated portion by calibrating the at least one lighting device to provide at least the mean color of the correlated portion. Thus, the at least one lighting device which is closest to a portion of the display to which it correlates, e.g. the left portion of the display correlates to a lighting device having a relative position to the left of the display of the host device. Determining a mean color of the correlated portion of the display of the host device may comprise calculating the mean color based on the pixels comprised in the correlated portion. Calibrating the at least one lighting device to provide at least the mean color of the correlated portion comprises controlling the lighting device to adapt the color being emitted to resemble the mean color of the correlated portion. Alternatively, the step of calibrating the at least one lighting device comprises providing a complementary color of the mean color of the correlated portion.

In one embodiment of the present invention, the media content being played on the display of the host device may comprise 3D content, and the processing unit may be configured to identify at least one source of lighting within the 3D content and correlate the at least one source of lighting to the at least one lighting device, and control the at least one lighting device to provide a lighting characteristic matching the at least one source of lighting within the 3D content. Hence, the at least one lighting device may be located e.g. behind an observer of the display and may correspond to at least one source of lighting within the 3D content being displayed such that the observer experiences the source of lighting as if appearing behind him or her in the room.

In another embodiment of the present invention, the processing unit may be further configured to determine whether the at least one lighting device is present in the vicinity of the host device by being configured to detect a signal strength of the wireless connection between the host device and the at least one lighting device, and determine whether the signal strength reaches a threshold signal strength.

In one embodiment of the present invention, the host device or lighting device may further comprise a component adapted to provide a movement signal if movement is detected, and wherein the processing unit is configured to detect a change in the position of either the host device or at least one lighting device, based on at least one of: a detected change in the signal strength between the at least one lighting device and the host device, a detected change in the position of the at least one lighting device with respect to the host device, a movement signal from the component in the host device, a movement signal from the component in the lighting device. The processing unit may be configured to adapt the lighting characteristics of the at least one lighting device according to the new relative position.

The wireless connection may form part of a wireless network, for example WLAN or Bluetooth. The invention is not limited to the two examples given, but could of course be implemented using any wireless connection with the possibility to determine e.g. the angle between a host device and a lighting device as described in connection with the first and/or second aspect.

The host device may at least one of: TV, display screen, projector, tablet, laptop, computer, phone, and the lighting device may be at least one of: a lamp, a light bulb, a luminaire, a tablet, a phone, a laptop, a projector.

According to yet another aspect of the present invention, the objectives are also at least partly achieved by a computer program product comprising a computer-readable storage medium with instructions adapted to carry out the method of any one of the embodiments of the first aspect when executed by a device having processing capability.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF EMBODIMENTS

In the present detailed description, embodiments of a method and system according to the present invention are mainly discussed with reference to schematic views showing a system and a flow chart outlining methods according to various embodiments of the invention. It should be noted that this by no means limits the scope of the invention, which is also applicable in other circumstances for instance with other types or variants of systems or devices than the embodiments shown in the appended drawings. Further, that specific components are mentioned in connection to an embodiment of the invention does not mean that those components cannot be used to an advantage together with other embodiments of the invention. The invention will now be described with reference to the enclosed drawings where first attention will be drawn to the structure, and secondly to the function.

Figure 1:
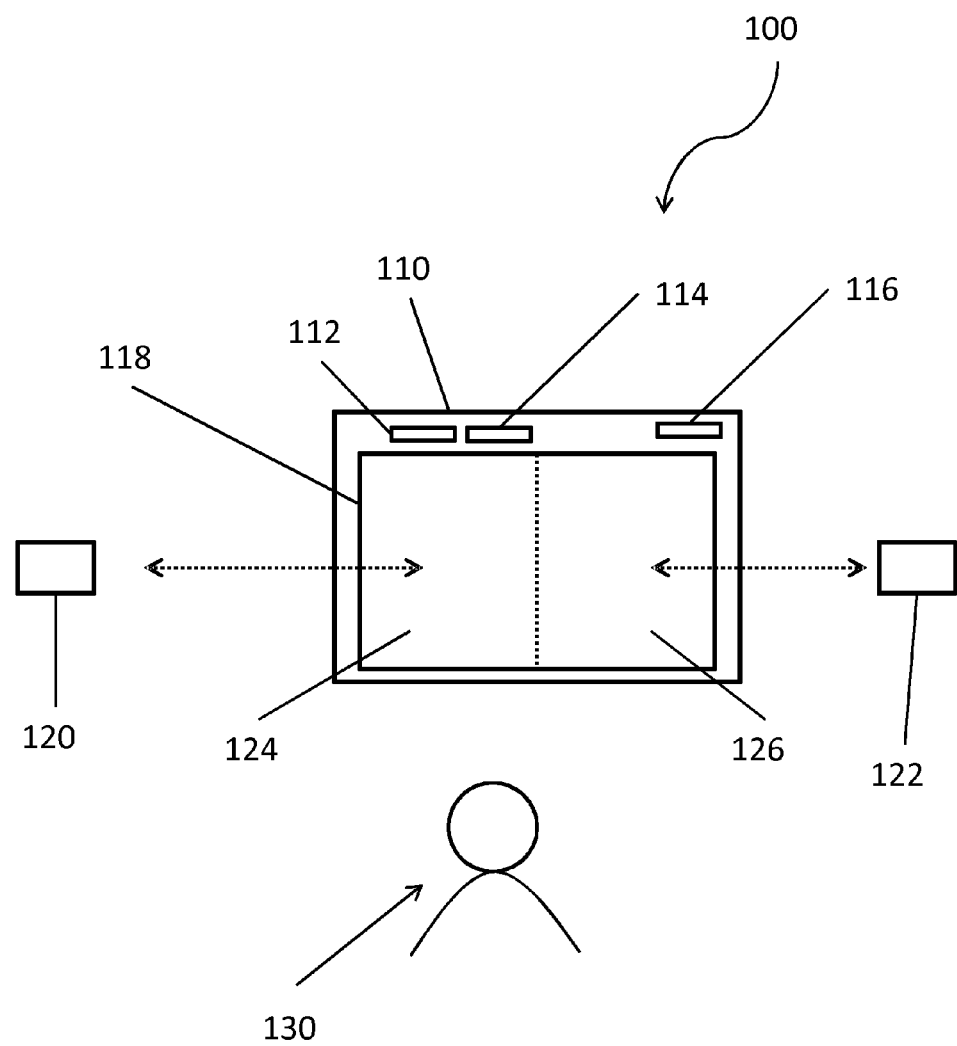
FIG. 1 shows a system for providing ambient light based on visual media content being displayed on a host device according to embodiments of the invention.

FIG. 1 show a system 100 for providing ambient light based on visual media content being displayed on a host device according to embodiments of the invention. The system 100 comprises a host device 110, a first lighting device 120, and a second lighting device 122. An observer 130 of the visual content is shown in order to illustrate that we are viewing the system 100 from 'behind' the observer 130. Further, is should be noted that the host device 110 and the first and second lighting device 120, 122 are wirelessly connected.

The host device comprises a first antenna 112, a second antenna 114, processing unit 116, and a display 118. The host device 110 shown in FIG. 1 is a TV. However, the host device 110 may of course be any kind of device capable of displaying visual media content such as a display screen, projector, tablet, laptop, computer or phone. The display 118 may be any kind of displaying capable of displaying visual media content being received directly or being encoded on a non-transitory computer readable medium. The processing unit 116 is connected to the first and second antenna 112, 114 for detecting and determining either angle of arrival or angle of departure to the first and second lighting device 120, 122 from the host device 110. For details regarding implementation of angle of arrival or angle of departure see e.g. 'Direction Finding positioning for 802.11' from doc.: IEEE 802.11-14/1263r0. The processing unit 116 is configured to determine a relative position of the first and second lighting device 120, 122 with regard to the host device 110 based on either angle of arrival and angle of departure of signals in the wireless connection between the host device 110 and the first and second lighting device 120, 122. The processing unit 116 is also configured to identify at least one portion of the display 118 of the host device 110, such as the indicated left portion 124 and right portion 126, correlating to the relative position of the first and second lighting device 120, 122. The processing unit 116 is further configured to control the first and second lighting device 120, 122 to provide a lighting characteristic which matches the portion of the display 118 correlating to each one of the first and second lighting device 120, 122 respectively. Controlling the first and second lighting device 120, 122 may comprise transmitting and receiving instructions via the wireless connection.

The first and second antenna 112, 114 mentioned herein are generally understood to be able to communicate wirelessly using electromagnetic waves for wireless communication standards such as Bluetooth, WiFi (802.11), Zigbee or the like. Using other types of wireless connection are of course also possible and within the scope of the invention. The host device 110 may comprise more than the two antennas 112, 114 shown. For example the host device 110 may comprise three, four, five, six or more antennas. The first and second antennas 112, 114, and processing unit 116 may thus comprise components such as transceiver circuitry, amplifiers, filters and so on for sending and receiving electromagnetic waves. In order to perform computations and carry out instructions received via hardware, e.g. the first and/or second antenna 112, 114 or software from a machine-readable memory (not shown) the processing unit 116 may comprise a processor, and thereto related circuits and memory. While the first and second antennas 112, 114 are typically is implemented in hardware; at least some portions of the processing unit 116 may typically be embodied by software modules. The present invention is not restricted to any particular realization, and any implementation found suitable to realize the herein described functionality may be contemplated. The processing unit 116 may of course comprise additional components such as the aforementioned machine-readable memory, both volatile and non-volatile, means for displaying information or media, e.g. a screen, and means for inputting information, such as a keyboard, a keypad, a directional pad, a mouse, a pen, a touch-screen and/or biometric mechanisms etc.

The first and second lighting device 120, 122 may be a lamp, a light bulb, a luminaire, a tablet, a phone, a projector, or a laptop. Hence, the first and second lighting device 120, 122 generally comprises at least one light source for emitting light, electronic circuitry, embodied in hardware or software, capable of providing a wireless connection and controlling the light emitted being from the lighting device. The first and second lighting device 120, 122 comprises at least one antenna to receive the signals from the host device 110. According to embodiments of the invention the lighting characteristics of the light emitted from the first and second lighting device 120,122 may be controlled. Lighting characteristics should thereby be interpreted as e.g. hue or color, intensity or brightness, cone or beam angle, a time varying factors, or direction. The beam angle or direction may e.g. be controlled by a motor, or the lighting device may comprise an array of light sources in which the light source which corresponds to a certain direction is lit in order to match the lighting characteristics. The electronic circuitry for controlling the light emitted from the lighting device may of course comprise additional components such as a processor and a machine-readable memory, both volatile and non-volatile, means for displaying information or media, e.g. a screen, and means for inputting information, such as a keyboard, a keypad, a directional pad, a mouse, a pen, a touch-screen and/or biometric mechanisms etc. Hence, the first and second lighting device 120, 122 may be a lamp, a light bulb, a luminaire, a tablet, a phone, a projector, a laptop or any other device wherefrom a wireless connection may be established and which has a controllable light source or display means, whereby the light emitted may be controlled.

Figure 2:
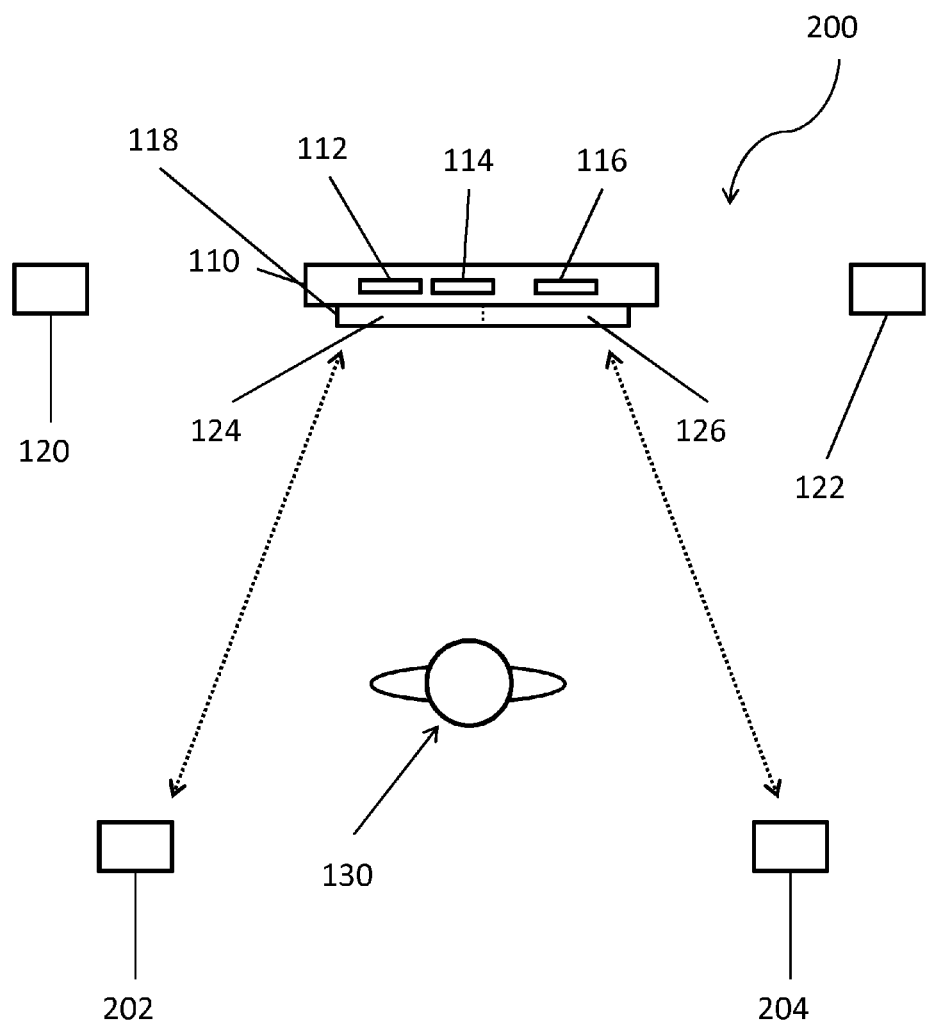
FIG. 2 shows another system for providing ambient light based on visual media content being displayed on a host device according to various embodiments of the invention.

FIG. 2 show a system 200 for providing ambient light based on visual media content being displayed on a host device according to various embodiments of the invention. Note that the view has shifted such that the system is seen from 'above'. The system 200 is shown to illustrate another embodiment of the system where the media content being displayed on the display of the host device 110 comprises 3D content. It should be understood that the host device 110 and the first and second lighting device 120, 122 are the same as described for the system 100 in FIG. 1. However, the system 200 further comprises a third lighting device 202 and a fourth lighting device 204. The third and fourth lighting device 202, 204 comprises the same components and features as the first and second lighting device 120, 122. The third lighting device 202 is arranged to the left and in front of the host device 110. The third lighting device 202 may thus correspond to the left portion 124 of the display 118 as indicated by the dashed arrow in FIG. 2. The fourth lighting device 204 is arranged to the right and in front of the host device 110. The fourth lighting device 202 may thus correspond to the right portion 126 of the display 118 as indicated by the dashed arrow in FIG. 2.

The processing unit 116 of the host device 110 shown in FIG. 2 is configured to identify at least one source of lighting within the 3D content and correlate the at least one source of lighting to at least one lighting device 120, 122, 202, 204, and control the at least one lighting device to provide a lighting characteristic matching the at least one source of lighting within the 3D content. The 3D content may be a computer game, movie etc. A source of lighting may be identified by exporting the position of light and ambiance from the 3D scene being displayed. Hence, if a source of lighting corresponds to illuminating a portion of the screen correlating to the fourth lighting device 204 is identified, e.g. by illuminating the right portion 126 of the display 118 from behind, the fourth lighting device 204 is controlled to provide lighting characteristics matching the lighting provided by the source of lighting within the 3D content. The first and second lighting devices 120, 122 may of course also be used if the identified source of light is coming from the either the left of right side of the display, respectively. Hence, embodiments of the present invention are also capable of immersing the observer 130 through also controlling lighting devices 202, 204 spatially arranged behind or around the observer 130.

Figure 3:
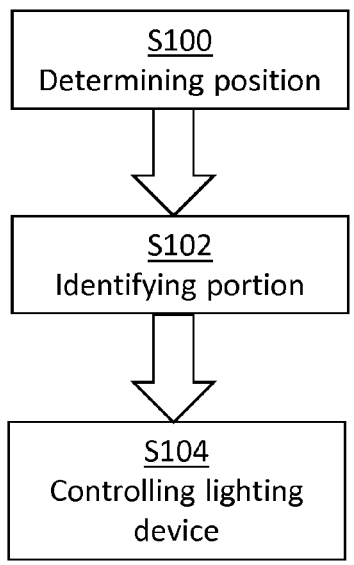
FIG. 3 shows a flow chart outlining a method according to various exemplary methods of the invention.

FIG. 3 shows a flow chart outlining the steps of a method according to embodiments of the present invention. The method will be described with reference also to FIG. 1 in order to illustrate the function of the system 100.

The first step S100 comprises determining a relative position of the first and second lighting devices 120, 122 based on characteristics of the wireless connection between the host device 110 and the first and second lighting devices 120, 122.

According to various embodiments of the invention, step S100 of determining a relative position of the first and second lighting device 120, 122 comprises detecting either angle of arrival or angle of departure of signals in the wireless connection between the host device 110 and the first and second lighting device 120, 122 using the first and second antenna 112, 114 and the processing unit 116.

The next step S102 comprises identifying at least one portion of the display 118 of the host device 110 correlating to the relative position of the first and second lighting device 120, 122. Hence, as the first lighting devices 120 relative position is to the left of the host device 118, the portion of the display 118 of the host device 110 correlating to the first lighting device 120 is identified as the left portion 124 of the display 118 by the processor unit 116. Likewise, as the second lighting devices 122 relative position is to the right of the host device 118, the portion of the display 118 of the host device 110 correlating to the first lighting device 120 is identified as the right portion 126 of the display 118 by the processor unit 116. Hence, in many of the various embodiments the correlated portion of the display 118 of the host device 130 is a portion of the display 118 of the host device 130 which is closest to the corresponding lighting device.

In the next step S104, the first and second lighting device 120, 122 are controlled to provide a lighting characteristic which matches their correlated portions 124, 126. Hence, the first lighting device 120 is controlled to emit lighting which has lighting characteristics matching the correlated portion, the left portion 124 of the display 118, such as hue or color, intensity or brightness, cone or beam angle, time variance, direction. Thus, one example may be to control the first lighting device 120 to emit the same color and intensity or brightness as the left portion 124 of the display. Another example may be to control the first lighting device 120 to emit a similar or complementary color and intensity or brightness as the left portion 124 of the display. Likewise the second lighting device 122 is controlled to emit lighting which has lighting characteristics matching the correlated portion, the right portion 124 of the display 118. Controlling the first and second lighting device 120, 122 may generally be interpreted as transmitting instructions over the wireless connection in order to instruct the first and second lighting device 120, 122 to adapt or configure their respective light sources to emit light having the desired lighting characteristics, i.e. matching the correlated portion 124, 126. Thus, while the visual content is being displayed the first and second lighting device 120, 122 are repeatedly controlled to provide a lighting characteristic which matches their correlated portions 124, 126 as the lighting characteristics of the visual content changes over time.

Figure 4:
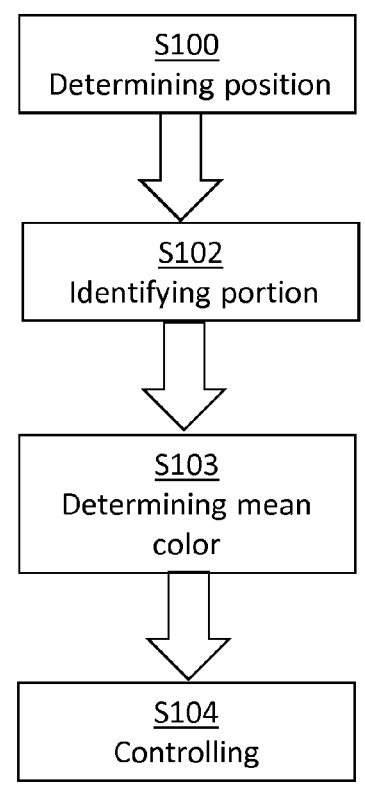
FIG. 4 shows another flow chart outlining a method according to various exemplary methods of the invention.

FIG. 4 shows a flow chart outlining the steps of a method according to embodiments of the present invention. The method in general comprises the same steps as the method described above in connection to FIG. 3. However, the method comprises an additional step S103 of determining a mean color of the correlated portion(s) of the display 118 of the host device 110. The mean color of the left portion 124 of the display 118 may be determined by e.g. calculating or combining the controlled color values from all the pixels comprised in the left portion 124 and calculating a mean color value, or by calculating a mean color for the left portion 124 based on the visual content using software or hardware calculation by the processing unit 116. Then, the step of controlling S104, the at least one lighting device to provide a lighting characteristic which matches the correlated portion further comprises calibrating the first lighting device 120 to provide at least the mean color of the correlated portion. Calibrating the first lighting device 120 to provide at least the mean color of the correlated portion 124 may comprise controlling the first lighting device 120 to adapt the color being emitted, by the first lighting device 120, to resemble the mean color of the correlated portion 124. The same of course applies for determining the mean color of the right side 126 of the display 118 and calibrating the second lighting device 122 to provide at least the mean color of the correlated portion 126. Thus, while the visual content is being displayed both the steps S103 and S104 are being repeatedly performed in order to control the first and second lighting device 120, 122.

Figure 5:
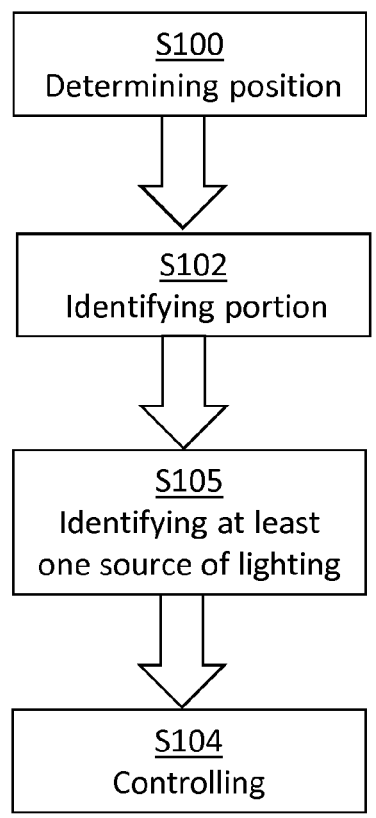
FIG. 5 shows another flow chart outlining a method according to various exemplary methods of the invention.

FIG. 5 shows a flow chart outlining the steps of a method according to embodiments of the present invention. The method will be described with reference also to FIG. 2 in order to illustrate the functioning of the system 200. The method in general comprises the same steps as the method described above in connection to FIG. 3. As noted above, in the embodiment shown in FIG. 2 and the method according to the embodiment illustrated in FIG. 5 the visual media content being displayed on the display 118 of the host device 110 comprises 3D content.

According to various embodiments the method further comprises the step of identifying at least one source of lighting within the 3D content S105, the source of lighting may be identified by exporting the position of light and ambiance from the 3D scene being displayed. Alternatively, there may be an application programming interface (API) to which the processing unit 116 may be connected in order to directly identify the at least one source of lighting within the 3D content. Further, the step of controlling the at least one lighting device to provide a lighting characteristic which matches the correlated portion S104 further comprises controlling the at least one lighting device to provide a lighting characteristic matching the at least one source of lighting within the 3D content. Hence, the lighting device to whom the correlated portion correlated to may be located e.g. behind an observer 130 of the display 118, such as the third and fourth lighting device 202, 204. Thus, while the visual content comprising 3D content is being displayed both the steps S105 and S104 are being repeatedly performed in order to control the lighting devices 120, 122, 202, 204 to provide a lighting characteristic matching the at least one source of lighting within the 3D content.

Figure 6:
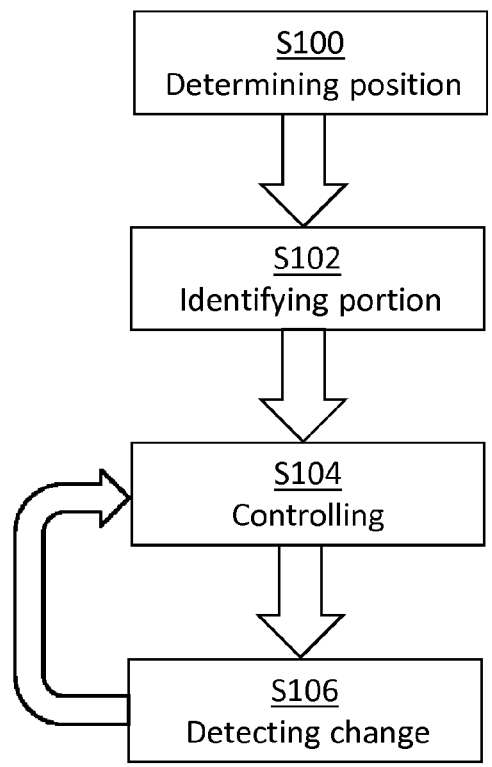
FIG. 6 shows another flow chart outlining a method according to various exemplary methods of the invention.

FIG. 6 shows a flow chart outlining the steps of a method according to embodiments of the present invention. The method will be described with reference also to FIG. 1 in order to illustrate the function of the system 200. The method in general comprises the same steps as the method described above in connection to FIG. 3. The method further comprises the step of detecting a change S106 in the relative position of a lighting device 120, 122, 202, 204, based on at least one of: a detected change in the signal strength of the wireless connection between the at least one lighting device and the host device, which may be indicate that either the host device 110 or the lighting device 120, 122, 202, 204 is either closer or father away from the host device 110, a detected change in the position of the at least one lighting device with respect to the host device, a movement signal from a component in the host device 110, a movement signal from a component in the lighting device 120, 122, 202, 204. Such a movement signal may e.g. be generated by an accelerometer or a similar component. Further, the step of controlling S104 at least one lighting device comprises adapting the lighting characteristics of the at least one lighting device according to the new relative position. Thus, while the visual content is being displayed both the steps S104 and S106 are being repeatedly performed in order to control the first and second lighting device 120, 122 and possibly detect a change in the relative position of a lighting device 120, 122, 202, 204.

In one embodiment, the relative change in the position of a lighting device 120, 122, 202, 204 may cause the method to be repeated in order to detect possible new lighting devices which should be controlled due to being in the vicinity of the host device 110. Hence, if the host device 110 is a mobile device such as a tablet or phone, a user may walk from the living room to the kitchen within his or her housing, and the relative change of position is detected and causes the method to be repeated. The lighting devices, and possibly new lighting devices which may be detected, are dynamically controlled based on the new determined position and angle to the lighting devices 120, 122, 202, 204 or other new lighting devices. The host device 110, or system 100, 200 may save room parameters by identifying the lighting devices 120, 122, 202, 204 e.g. by their MAC-addresses etc. or relative positions, in order to automatically identify the room within which the host device 110 is located and the lighting devices which should be controlled within that room.

It is of course also possible that the relative position of the host device 110 changes due to the fact the visual media content is being displayed on another device, e.g. the visual media content may be streamed to another device, even on one of the devices which was one of the lighting devices, and the method adapts the control of the lighting devices accordingly.

According to some embodiments of the invention, the step of determining a relative position of the a lighting device 120, 122, 202, 204 may further comprise detecting whether the lighting device 120, 122, 202, 204 is present in the vicinity of the host device 110 by detecting a signal strength of the wireless connection between the host device 110 and the lighting device 120, 122, 202, 204, and determining whether the signal strength reaches a threshold signal strength. The threshold signal strength may be a predetermined signal strength determined such that lighting devices 120, 122, 202, 204 which are spaced apart from the host device by more than predetermined distance may not reach the threshold signal strength. Likewise, lighting devices behind obstacles, e.g. walls or doors may not reach the threshold signal strength. Lighting devices which do not reach the threshold signal strength are preferably not controlled to match the lighting characteristics of a correlated portion of the display. The predetermined distance may be set to 10 m, 15 m, 20 m, or 25 m or more. The threshold signal strength may also be manually set by a user in the host device 110 such that only lighting devices within the room where the host device 110 is located are controlled. It is of course also possible that a user may through setting manually disable or enable the control of lighting devices in order to include certain lighting devices or avoid that lighting devices which are closely located but in another room are controlled.

According to various embodiments of the invention, controlling the at least one lighting device 120, 122, 202, 204 to provide a lighting characteristic which matches the correlated portion may further comprise determining a position of an observer 130 of the visual content being displayed on the host device 110, and controlling the lighting devices 120, 122, 202, 204 to provide a lighting characteristic based on the relative position between the observer 130 of the visual content being displayed on the host device 110 and the lighting devices 120, 122, 202, 204. The position of the observer 130 of the visual content being displayed on the host device 110 may be determined by identifying the observer 130 using a camera (not shown) mounted in the host device 110, a camera (not shown) in the lighting devices 120, 122, 202, 204 or a camera (not shown) mounted in the room where the host device 110 is located. The position of the observer 130 of the visual content being displayed on the host device 110 may be used to determine distance or angle between the observer 130 of the visual content being displayed on the host device 110 and the lighting devices 120, 122, 202, 204. Controlling the lighting devices 120, 122, 202, 204 to provide a lighting characteristic based on the relative position between the observer 130 of the visual content being displayed on the host device 110 and the lighting device 120, 122, 202, 204 may comprise controlling any lighting characteristic based on the relative position. For example, increasing or decreasing the brightness or luminosity of the light being emitted from the lighting device, or controlling the cone of light being emitted from the lighting device, and/or the angle at which light is emitted from the lighting device in order to also take into account the position of the observer. Another exemplary use of the relative position between the observer of the visual content being displayed on the host device and the at least one lighting device is to control the at least one lighting device to emit no light if the at least one lighting device is positioned in a path between the observer of the visual content being displayed on the host device as a lighting device emitting light can then lead to deteriorated visual experience.

It is of course also possible that the visual media content being displayed comprises 3D content but that the mean color of a portion of the display is also calculated and used to control some of the lighting devices connected to the host device while some other lighting devices are controlled according to at least one source of lighting within the 3D content.

In the above description the host device has been described as having at least two antennas to be able to determine the angle of arrival or angle of departure to the lighting devices. It is of course also possible and contemplated within the present invention that at least one lighting device may comprise two antennas and determine the relative position of the other lighting devices and the host device and then transmit that information to the host device which then controls the lighting devices according to the present invention.

In the above described embodiments illustrated in the drawings only two portions, left and right, of the display of the host device are indicated, it is of course also possible that the display of the host device or the portions thereof are divided or subdivided into a plurality of portions such as four, nine, or sixteen portions or more. The display may also be divided into portions corresponding to the aspect ratio of the display such that there are four portions in width and three in height, or sixteen in width and nine in height, sixteen in width and ten in height, or twenty on in width and nine in height. The above divisions correspond to well known and used aspect ratios for visual content which may be advantageous in order to divide the display into portions which adhere to the given width and height of the display. A single portion may then correlate to the closest lighting device, or several such portions may correlate to one lighting device located as shown in FIG. 1. For example, the outermost portions around the edge of the display may correlate to a lighting device which is closest to at least one of those portions. Further, it is of course possible that more than two lighting devices as shown in FIG. 1 are arranged in the vicinity of the host device, and that the number of portions into which the display is divided corresponds to the number of lighting devices arranged in the vicinity of the host device.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for providing ambient light based on visual media content being displayed on a display of a host device, wherein the host device has a wireless connection to at least one lighting device, which method comprises:
   determining a relative position of the at least one lighting device based on characteristics of the wireless connection between the host device and the at least one lighting device;
   identifying at least one portion of the display of the host device correlating to the relative position of the at least one lighting device; and
   controlling the at least one lighting device to provide a lighting characteristic which matches the correlated portion.

2. The method according to claim 1, wherein the step of determining a relative position of the at least one lighting device comprises detecting at least one of:
   angle of arrival or
   angle of departure of signals in the wireless connection between the host device and the at least one lighting device.

3. The method according to claim 1, wherein the correlated portion of the display of the host device is a portion of the display of the host device which is closest to the at least one lighting device, and wherein the method further comprises the step of:
   determining a mean color of the correlated portion of the display of the host device, and wherein the step of controlling the at least one lighting device to provide a lighting characteristic which matches the correlated portion comprises calibrating the at least one lighting device to provide at least the mean color of the correlated portion.

4. The method according to claim 1, wherein the visual media content being displayed on the display of the host device comprises 3D content, and the method further comprises the step of:
   identifying at least one source of lighting within the 3D content, and wherein the step of controlling the at least one lighting device to provide a lighting characteristic which matches the correlated portion comprises controlling the at least one lighting device to provide a lighting characteristic matching the at least one source of lighting within the 3D content.

5. The method according to claim 1, wherein the step of determining a relative position of the at least one lighting device comprises detecting whether the at least one lighting device is present in the vicinity of the host device by detecting a signal strength of the wireless connection between the host device and the at least one lighting device, and determining whether the signal strength reaches a threshold signal strength.

6. The method according to claim 1, further comprising the step of:
  detecting a change in the relative position of the at least one lighting device, based on at least one of: a detected change in the signal strength of the wireless connection between the at least one lighting device and the host device, a detected change in the position of the at least one lighting device with respect to the host device, a movement signal from a component in the host device, a movement signal from a component in the lighting device, wherein the step of controlling the at least one lighting device comprises adapting the lighting characteristics of the at least one lighting device according to the new relative position.

7. A host device for providing ambient light based on visual media content being displayed on a display of the host device, wherein the host device has a wireless connection to at least one lighting device, which host device comprises:
  a display for displaying visual media content;
  at least two antennas; and
  a processing unit connected to the at least two antennas for detecting at least one of angle of arrival and angle of departure of signals in the wireless connection between the host device and the least one lighting device;
  wherein the processing unit is configured to determine a relative position of the at least one lighting device based on characteristics of the wireless connection between the host device and the at least one lighting device, the characteristics of the wireless connection comprising at least one of angle of arrival and angle of departure of signals in the wireless connection between the host device and the at least one lighting device, and the processing unit is further configured to identify at least one portion of the display of the host device correlating to the relative position of the at least one lighting device, and control the at least one lighting device to provide a lighting characteristic which matches the correlated portion.

8. A system for providing ambient light based on visual media content being displayed on a host device, wherein the host device has a wireless connection to at least one lighting device, said system comprising:
  at least one lighting device;
  a host device comprising:
    a display for displaying visual media content;
    at least two antennas; and
    a processing unit connected to the at least two antennas for detecting at least one of angle of arrival and angle of departure of signals in the wireless connection between the host device and the at least one lighting device;
  wherein the processing unit is configured to determine a relative position of the at least one lighting device based on characteristics of the wireless connection between the host device and the at least one lighting device, the characteristics of the wireless connection comprising at least one of angle of arrival and angle of departure of signals in the wireless connection between the host device and the at least one lighting device, and the processing unit is further configured to identify at least one portion of the display of the host device correlating to the relative position of the at least one lighting device, and control the at least one lighting device to provide a lighting characteristic which matches the correlated portion.

9. The system according to claim 8, wherein the correlated portion of the display of the host device is a portion of the display of the host device which is closest to the at least one lighting device, and wherein the processing unit is configured to determine a mean color of the correlated portion of the display of the host device, and wherein the processing unit is configured to control the at least one lighting device to provide a lighting characteristic which matches the correlated portion by calibrating the at least one lighting device to provide at least the mean color of the correlated portion.

10. The system according to claim 8, wherein the visual media content being displayed on the display of the host device comprises 3D content, and the processing unit is configured to identify at least one source of lighting within the 3D content and correlate the at least one source of lighting to the at least one lighting device, and control the at least one lighting device to provide a lighting characteristic matching the at least one source of lighting within the 3D content.

11. The system according to claim 8, wherein the processing unit is further configured to determine whether the at least one lighting device is present in the vicinity of the host device by being configured to detect a signal strength of the wireless connection between the host device and the at least one lighting device, and determine whether the signal strength reaches a threshold signal strength.

12. The system according to claim 8, wherein the host device or the at least one lighting device further comprises a component adapted to provide a movement signal if movement is detected, and wherein the processing unit is configured to detect a change in the position of either the host device or the at least one lighting device, based on at least one of: a detected change in the signal strength between the at least one lighting device and the host device, a detected change in the position of the at least one lighting device with respect to the host device, a movement signal from the component in the host device, a movement signal from the component in the at least one lighting device, wherein the processing unit is configured to adapt the lighting characteristics of the at least one lighting device according to the new relative position.

13. A system according to claim 8, wherein the wireless connection forms part of a wireless network, for example WLAN or Bluetooth.

14. A system according to claim 8, wherein the host device is at least one of:
  TV, display screen, projector, tablet, laptop, computer, phone, and
  wherein the at least one lighting device is at least one of:
    a lamp, a light bulb, a luminaire, a tablet, a phone, a laptop, a projector.

15. A non-transitory computer program product comprising a computer-readable storage medium with instructions adapted to instruct a processor to perform a method when executed by a device having processing capability, wherein the method provides ambient light based on visual media content displayed on a display of a host device, wherein the host device has a wireless connection to at least one lighting device, the computer-readable medium including:
- instructions to determine a relative position of the at least one lighting device based on characteristics of the wireless connection between the host device and the at least one lighting device;
- instructions to identify at least one portion of the display of the host device correlating to the relative position of the at least one lighting device; and
- instructions to control the at least one lighting device to provide a lighting characteristic which matches the correlated portion.

16. The computer-readable medium of claim 15, wherein the instructions to determine the relative position of the at least one lighting device comprises instructions to detect at least one of:
- angle of arrival or
- angle of departure of signals in the wireless connection between the host device and the at least one lighting device.

17. The computer-readable medium according to claim 15, wherein the correlated portion of the display of the host device is a portion of the display of the host device which is closest to the at least one lighting device, and wherein the computer-readable medium further comprises:
- instructions to determine a mean color of the correlated portion of the display of the host device, and wherein the instructions to control the at least one lighting device to provide the lighting characteristic which matches the correlated portion comprises instructions to calibrate the at least one lighting device to provide at least the mean color of the correlated portion.

18. The computer-readable medium according to claim 15, wherein the visual media content displayed on the display of the host device comprises 3D content, and the computer-readable medium further comprises:
- instructions to identify at least one source of lighting within the 3D content, and wherein the instructions to control the at least one lighting device to provide a lighting characteristic which matches the correlated portion comprises instructions to control the at least one lighting device to provide a lighting characteristic matching the at least one source of lighting within the 3D content.

19. The computer-readable medium according to claim 15, wherein the instructions to determine a relative position of the at least one lighting device comprises instructions to detect whether the at least one lighting device is present in the vicinity of the host device by detecting a signal strength of the wireless connection between the host device and the at least one lighting device, and instructions to determine whether the signal strength reaches a threshold signal strength.

20. The computer-readable medium according to claim 15, further comprising:
- instructions to detect a change in the relative position of the at least one lighting device, based on at least one of: a detected change in the signal strength of the wireless connection between the at least one lighting device and the host device, a detected change in the position of the at least one lighting device with respect to the host device, a movement signal from a component in the host device, a movement signal from a component in the lighting device, wherein the instructions to control the at least one lighting device comprises instructions to adapt the lighting characteristics of the at least one lighting device according to the new relative position.

* * * * *